R. P. PICTET.
PROCESS OF SEPARATING GASEOUS MIXTURES INTO THEIR CONSTITUENTS.
APPLICATION FILED JUNE 27, 1913.

1,119,312.

Patented Dec. 1, 1914.

2 SHEETS—SHEET 1.

R. P. PICTET.
PROCESS OF SEPARATING GASEOUS MIXTURES INTO THEIR CONSTITUENTS.
APPLICATION FILED JUNE 27, 1913.

1,119,312.

Patented Dec. 1, 1914.
2 SHEETS—SHEET 2.

UNITED STATES PATENT OFFICE.

RAOUL PIERRE PICTET, OF BERLIN-WILMERSDORF, GERMANY.

PROCESS OF SEPARATING GASEOUS MIXTURES INTO THEIR CONSTITUENTS.

1,119,312.     Specification of Letters Patent.     Patented Dec. 1, 1914.

Application filed June 27, 1913. Serial No. 776,062.

*To all whom it may concern:*

Be it known that I, RAOUL PIERRE PICTET, a citizen of the Swiss Republic, residing at Hildegardstrasse 12ª, Berlin - Wilmersdorf, in the Empire of Germany, have invented certain new and useful Improvements in Processes of Separating Gaseous Mixtures into Their Constituents, of which the following is a specification.

This invention relates to a partial liquefaction process for the separation of a gaseous mixture into its constituents, which process is specially adapted for the separation of atmospheric air into oxygen and nitrogen.

It has been usual hitherto to employ the so-called rectification process, which necessitates the compression to a fairly high pressure of the whole of the gaseous mixture to be separated and requires a considerable expenditure of power.

The present process permits of the systematic reduction of all the operations and compressions to a theoretical minimum, and is based on the commercial application of the principle of least effort. In the method adopted in this process (taking for example atmospheric air), the air is previously cooled and purified and is brought into contact with liquid nitrogen in which the oxygen dissolves, the pure nitrogen escaping at the upper part of the apparatus and the oxygen being separated by evaporation of the liquid mixture in which it is contained, under the effect of the heat of liquefaction of the pure gaseous nitrogen, which, in escaping from the upper part of the apparatus is collected, cooled, compressed and reintroduced under pressure into the apparatus, where it is re-liquefied. In this process according to the present invention the gaseous nitrogen (or less liquefiable constituent of the mixture) withdrawn at the upper part of the apparatus, is compressed and is distributed to the separating apparatus at different points and under different and suitably chosen pressures such that it is always just re-liquefied whatever may be the temperature of the medium into which it is introduced, a temperature which depends on the composition of the gaseous mixture at the point of introduction. Such liquefaction supplies the heat required to evaporate the liquid mixture in the apparatus.

Figure 1:
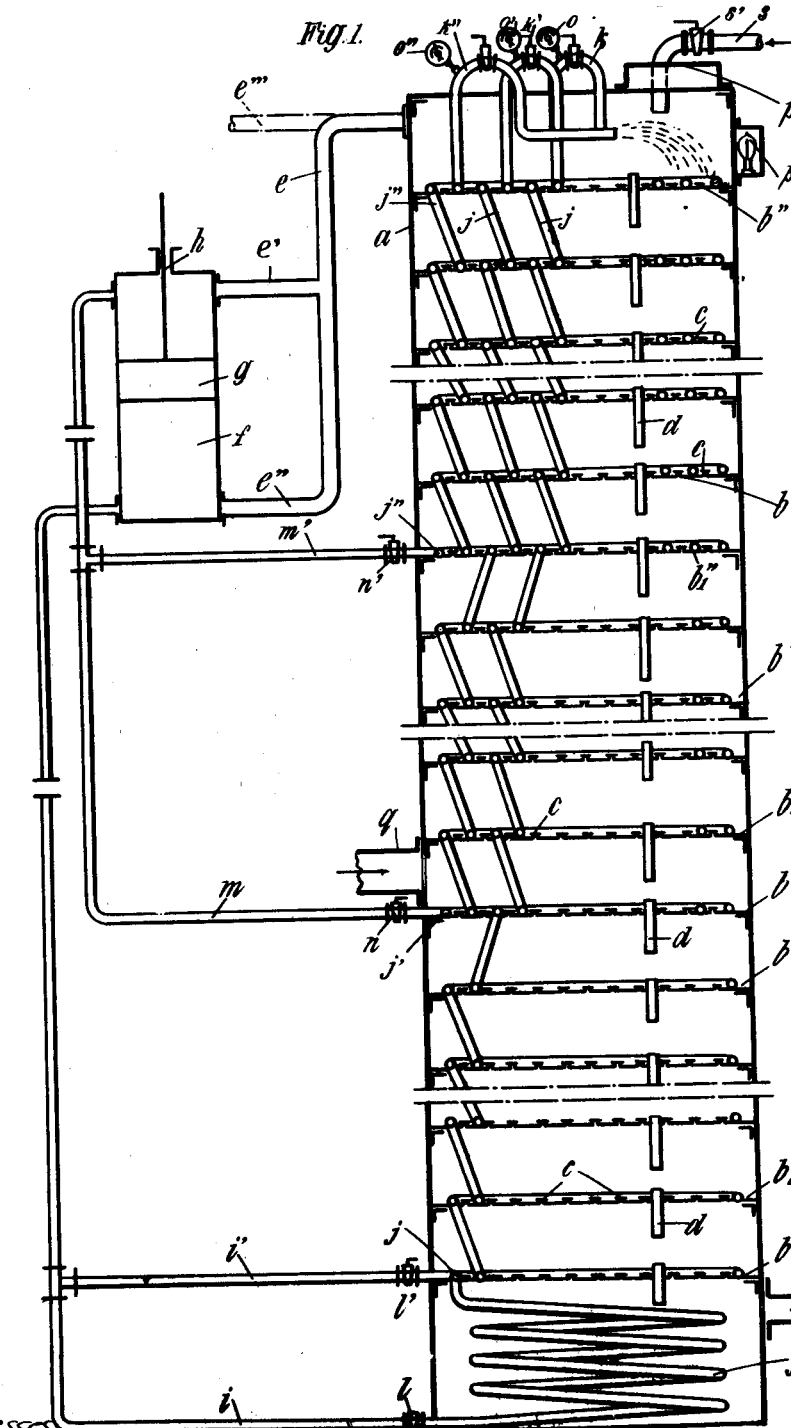
Figure 2:
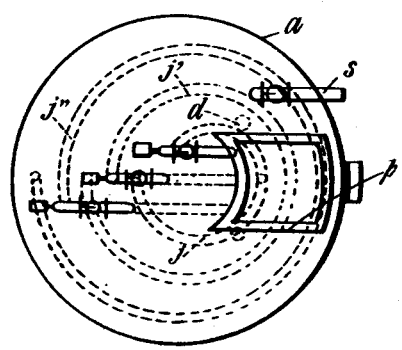

The process will be more easily understood by taking its application to the separation of air into oxygen and nitrogen by means of an apparatus such as is represented diagrammatically in vertical section in Figure 1 and in plan in Fig. 2 of the accompanying drawings. It is to be understood, however, that the oxygen and nitrogen may be regarded as typical respectively of a more easily and a less easily liquefiable gas in any gaseous mixture which may be separated by this process.

In a column $a$ are mounted parallel superposed plates or trays $b$ provided with mixing apertures $c$ and overflow tubes $d$. These trays are distributed preferably in three series $b$, $b'$, $b''$ of, for example, six trays. At the top of the column is a pipe $e$ for the escape of the gases, which are partly drawn off by a compressor $f$ operating under two different pressures at the opposite sides of the piston $g$, the rod of which passes through the stuffing box $h$. The two compressor chambers are supplied by branch pipes $e'$ and $e''$. Two or more separate compressors may of course be used for the production of different pressures.

$e'''$ indicates the branch pipe for the withdrawal of the nitrogen not required for the compressor.

The gases drawn in at the bottom of the compressors are compressed to a suitable pressure (say, 4 or 5 atmospheres) then cooled in exchangers, not shown in the drawing, and are discharged by a pipe $i$ into a coil $j$ immersed in the liquid at the bottom of the column, which liquid at the beginning of the operation is ordinary liquid air. The gases are liquefied and cause the boiling of the liquid air in which the coil $j$ is immersed. This coil after leaving the bottom of the column continues its convolutions on all the trays of the column up to the top, where it ends in a cross-pipe provided with a regulating valve $k$ adapted to operate at a predetermined pressure, which permits the liquid formed in the interior of the coil to escape on to the upper tray $b''$. A valve $l$ at the beginning of the coil $j$ allows the supply of the gases to the coil to be cut off or regulated.

A branch pipe $i'$ provided with a valve $l'$ allows the whole or a part of the gas coming from the bottom of the compressor to be directed into that part of the coil $j$ which lies on the first tray $b$ directly above the bottom of the column. Thus the gases compressed in the lower part of the compressor can divide into two currents, meeting after having been liquefied on the first of the lower trays of the column and continuing up to the top of the column. The gas compressed in the upper part of the compressor also divides into two currents, passing respectively through the pipes $m$ and $m'$ provided with the regulating valves $n$ and $n'$. One of these currents flows into the coil $j'$ which starts from the first tray $b'$ of the second series of trays and continues to the top of the column. The other current flows into a third coil $j''$ which starts from the first tray $b''$ of the third series of trays and continues to the top of the column. The two coils $j'$ and $j''$ end like $j$ in cross-pipes provided with regulating valves $k'$ and $k''$ adapted to open at different predetermined pressures and all three coils $j$, $j'$ and $j''$ discharge separately on to the upper tray $b''$ the liquefied gases which they carry.

At the commencement of the operations, as already mentioned, liquid air fills all the trays of the column, and, boiling on all the trays, rapidly loses its nitrogen and gradually changes at the bottom of the column into a liquid rich in oxygen. The gases drawn in and then liquefied in the three coils cannot contain, at the beginning, more that 7% of oxygen since they are gases emitted from the liquid air under atmospheric pressure. As the liquid in the coils is discharged on to the upper tray it emits new vapors which are poorer in oxygen and are themselves partially drawn off, re-liquefied and re-discharged on to the upper tray in a continuous manner. Thus the oxygen contained in the aspirated gas steadily diminishes and rapidly becomes zero, the gas soon becoming chemically pure nitrogen which leaves the column in a gaseous state and flows in part on to the top tray in a liquid state. During this action the liquid at the bottom of the column has become pure oxygen, as all the overflow tubes $d$ cause the liquid to flow down the column, which liquid dissolves the rising oxygen in tray after tray while the heat of liquefaction of the nitrogen in the coils drives the nitrogen in the trays to the top. By the time the bottom of the column is reached all the nitrogen has been driven off. The liquid air with which the process starts is thus transformed into two separate substances, one pure nitrogen at the top of the column, the other pure or very rich liquid oxygen in the lower trays. Consequently the temperature of the trays varies, according to their position in the column, between $-182°$, the temperature of liquid oxygen boiling under atmospheric pressure at the bottom of the column, and $-195°$, the boiling point of liquid nitrogen at the top. This explains the arrangement of the four gas admission pipes, $i$, $i'$ $m$, $m$, which are for the purpose of providing four independent heat sources spaced in the required manner at different heights of the column. Owing to the supply of heat by liquefaction of nitrogen at different temperatures, which temperatures are the boiling points of the liquid mixtures at the various levels of introduction of the nitrogen coils, the amount of nitrogen used in the coils, the power required for compression and the heat used in evaporation of the mixtures are all reduced to a minimum and each part of the column performs its functions of evaporation and separation with the maximum efficiency.

The pure nitrogen drawn in by the compressor must be subjected to a pressure of, say 4.5 atmospheres in order to be completely liquefied at the bottom of the column, that is to say at $-182°$; to 3.8 atmospheres (obtained by adjustment of the valve $l'$) to be liquefied on the tray $b$; and finally to 2.5 and to 1.2 atmospheres to be liquefied in the coils $j'$ and $j''$ respectively. The three valves $k$, $k'$ and $k''$ permit of separate regulation of the pressure and output of each of the coils $j$, $j'$ and $j''$, which pressures and outputs can be controlled at any moment by means of the indications of the gages $o$, $o'$ and $o''$ and by examining through a sight hole $p$ the three streams of liquefied gas flowing from the upper ends of the coils and illuminated by an incandescent lamp $p'$.

When the action of the column is established a fan is started (not shown in the drawing) to give a small pressure of about $\frac{1}{20}$ (one-twentieth) of an atmosphere sufficient to cause atmospheric air (cooled in ordinary exchangers, which retain the water vapor and lower the temperature of the air nearly to the point of liquefaction, and entering the column at $q$) to traverse the trays through the mixing channels $c$, from the bottom to the top in opposition to the descending stream of nitrogen. The point $q$ of admission of the air is located slightly below the middle of the column as the gases arising from the tray situated at that height should have substantially the same constitution as that of atmospheric air. The oxygen of the atmospheric air thus introduced into the column dissolves in the liquid nitrogen on the trays and descends by gravity, the oxygen content of the liquid becoming gradually greater, while the gaseous nitrogen traverses all the trays without liquefying, increasing in volume by the evaporation from each tray, and is liberated at the top of the column at $e$ free from oxygen. The heat of liquefaction of the portion of pure nitrogen compressed in the coils produces proportionate evaporation of oxygen and nitrogen, the proportion of oxygen contained in the gaseous mixture thus produced increasing from the top to the bottom of the column, the lower part of the latter giving pure gaseous oxygen which escapes through the pipe *r*. The gages *o*, *o'* and *o''*, the discharge valves *k*, *k' k''* and the direct view of the liquid flowing in the three coils permit the normal operation of the column to be regulated in such a manner that the gas output through *r* is equal to the volume of oxygen brought in by the current of atmospheric air.

Owing to the distribution of four independent sources of liquefying gas under different pressures, there is on each tray an ebullition of the same intensity, if the adjustments are perfect. This very active ebullition causes the nitrogen to be freed rapidly from the liquid on the trays and is the more active the greater the output of the compressor. It causes the formation of a froth containing innumerable small bubbles, the total surfaces of which act so as to dissolve the ascending oxygen, which rises through the mixing apertures *c*. The greater the amount of froth the more rapidly the nitrogen is expelled from the liquid and the more perfectly trays retain by solution the gaseous oxygen which passes through them. Additional liquid air or liquid nitrogen necessary to compensate for the introduction of heat due to losses by radiation and to insure conditions for efficient operation, is admitted into the column through a pipe *s* provided with a valve *s'*. For liquid nitrogen this pipe is at the top of the column as shown, but for liquid air it is placed lower down in the column.

What I claim and desire to secure by Letters Patent of the United States is:—

1. A process for the separation of a gaseous mixture into its constituents consisting in subjecting the gaseous mixture in a separating apparatus to the action of a descending stream of the same constituents in liquid form and progressively differing proportions and in distributing the less liquefiable gas at different pressures to different levels of the said apparatus but without mixing with the mixed constituents, the pressures being adjusted so that liquefaction of the said gas is effected at the temperature of the mixture at each point of entry of the gas into the apparatus.

2. A process for the separation of a gaseous mixture into its constituents consisting in subjecting the gaseous mixture in a separating apparatus to the action of a descending stream of the same constituents in liquid form and progessively differing proportions and in distributing the less liquefiable gas at different pressures to different levels of the said apparatus through a series of pipes discharging into the upper part of the apparatus, the pressures being adjusted so that liquefaction of the said gas is effected at the temperature of the mixture at each point of entry of the gas into the apparatus.

3. A process for the separation of atmospheric air into oxygen and nitrogen consisting in subjecting cooled gaseous air in a separating apparatus to the action of a descending liquid stream of mixed nitrogen and oxygen of varying proportions in which the oxygen in the gaseous air is progressively dissolved and in distributing nitrogen at different pressures to different levels of the apparatus but without mixing with the said mixed constituents, the pressures being so adjusted that the nitrogen is just liquefied at each point of entry and effects evaporation of the liquid mixture by its heat of liquefaction.

4. A process for the separation of atmospheric air into oxygen and nitrogen consisting in subjecting cooled gaseous air in a separating apparatus to the action of a descending liquid stream of mixed nitrogen and oxygen of varying proportions in which the oxygen in the gaseous air is progressively dissolved and in distributing nitrogen in separate streams at different pressures to different levels of the apparatus, all the streams passing upward from their points of entry through the apparatus to its upper end and there discharging into the apparatus to form part of the aforesaid descending stream, the pressures being so adjusted that the nitrogen is first liquefied at each point of entry and effects evaporation of the liquid mixture by its heat of liquefaction.

5. A process for the separation of atmospheric air into oxygen and nitrogen consisting in subjecting cooled gaseous air in a separating apparatus to the action of a descending liquid stream which at the upper end of the apparatus is pure nitrogen and in which the oxygen in the gaseous air is progressively dissolved and in distributing nitrogen at different pressures to different levels of the apparatus but without mixing with the said mixed constituents the pressures being so adjusted that the nitrogen is just liquefied at each point of entry and effects evaporation of the liquid mixture by its heat of liquefaction.

6. A process for the separation of a gaseous mixture into its constituents consisting in subjecting the gaseous mixture in a separating apparatus to the action of a progressively varying liquid mixture of the same constituents which descends in a succession of liquid layers while the gaseous mixture passes upward through the liquid layers in intimate contact therewith, and in effecting the boiling of said liquid by means of a succession of streams of the less liquefiable gas passing through the said layers without mixing therewith, which streams start at different heights in the separating apparatus and pass to the upper end, and are introduced at pressures progressively greater for those starting at lower points and such that the said gas just liquefies at the temperature of the mixture at the various levels of entry.

7. A process for the separation of atmospheric air into oxygen and nitrogen which consists in subjecting an upward stream of gaseous air in a separating apparatus to the action of a descending stream of liquid nitrogen in a succession of liquid layers, which liquid dissolves the oxygen from the gaseous air and forms in the layers a mixture becoming progressively richer in oxygen, and in effecting the boiling of the said liquid layers by means of a succession of streams of nitrogen, which streams start at different heights in the separating apparatus and pass to the upper end through the said liquid layers without mixture therewith, the nitrogen being supplied under such different pressures that it just liquefies at the temperature of the mixture in the layers at the points of entry of the nitrogen.

In testimony whereof I affix my signature in presence of two witnesses.

RAOUL PIERRE PICTET.

Witnesses:
　HENRY HASPER,
　WOLDEMAR HAUPT.